Feb. 21, 1956

C. W. CHILLSON 2,735,516

BRAKE MECHANISM

Original Filed June 8, 1946

INVENTOR
CHARLES W. CHILLSON
Godfrey B. Speir
ATTORNEY

Feb. 21, 1956 C. W. CHILLSON 2,735,516
BRAKE MECHANISM
Original Filed June 8, 1946 4 Sheets-Sheet 4

INVENTOR
Charles W. Chillson
BY Godfrey O. Speir
Attorney

United States Patent Office 2,735,516
Patented Feb. 21, 1956

2,735,516

BRAKE MECHANISM

Charles W. Chillson, Caldwell, N. J., assignor to Curtiss-Wright Corporation, a corporation of Delaware Original application June 8, 1946, Serial No. 675,383, now Patent No. 2,640,552, dated June 2, 1953. Divided and this application November 12, 1952, Serial No. 320,045

7 Claims. (Cl. 188—105)

This invention relates to variable pitch propellers, and more particularly to such propellers wherein power for effecting changes of blade pitch is primarily derived from the propeller drive shaft, and is a division of patent application Serial No. 675,383 filed June 8, 1946 (now Patent No. 2,640,552 issued June 2, 1953).

In variable pitch propellers, it has become desirable to increase the speed with which changes in pitch may be effected. This is particularly true where reverse pitch is to be employed for reducing the speed of an aircraft as when landing or during other maneuvers. Also, it is desirable to feather a propeller rapidly. The speed with which such changes can be made depends on the forces to be overcome, such as the centrifugal blade twisting moment, the inertia of the parts, the friction and the power available to effect the change.

A particular object of the invention is to provide a novel form of fail-safe brake to hold the propeller blades against pitch change.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had to the appended claims.

In the drawings, wherein like reference characters indicate like parts:

Figure 1:
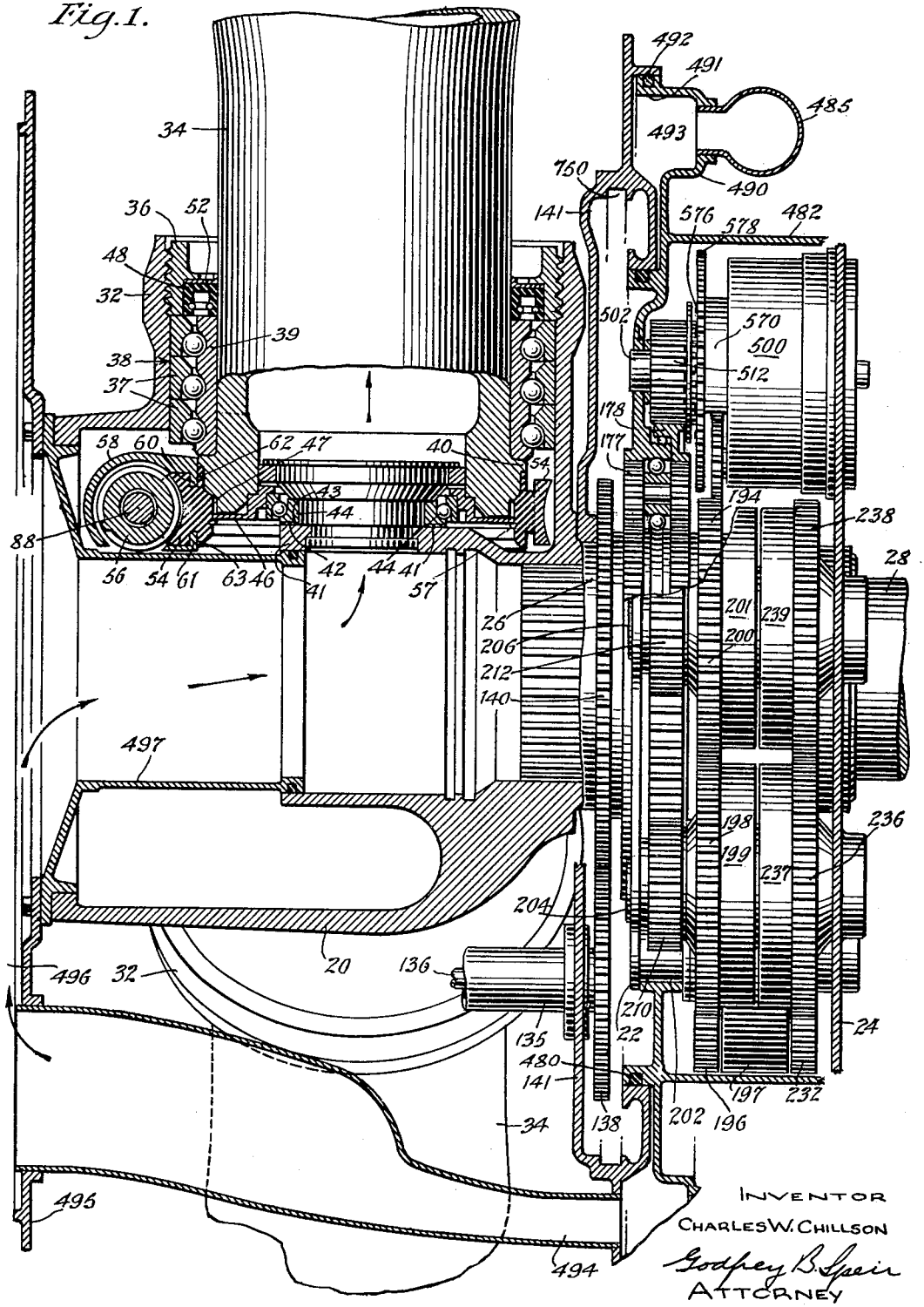
Fig. 1 is a plan view of the propeller and pitch changing assembly looking downwardly at an inclined angle, certain of the parts being cut away and shown in section.
Figure 4:
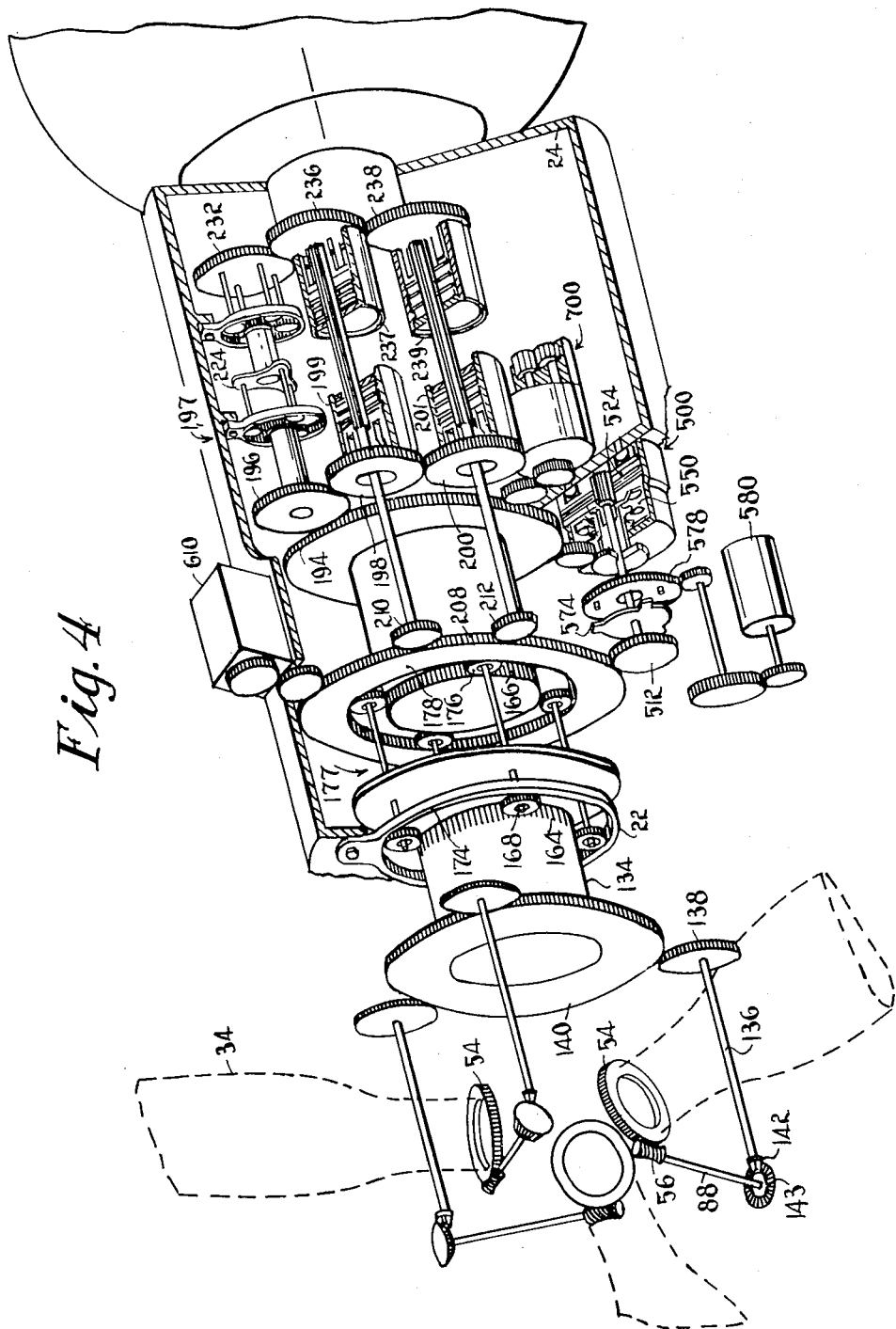
Fig. 4 is a perspective schematic view partly broken away, showing principal components of the propeller and pitch changing assembly.

A reference to Figs. 1 and 4 will disclose the general arrangement of a preferred form of the invention and serve to correlate the various parts hereinafter described in more detail. Therein appears a propeller hub 20, having a plurality of blade sockets 32 for swivelly receiving the shanks 34 of the propeller blades. The hub is provided with an integral sleeve 26 extending to the rear, within which is splined a drive shaft 28. Disposed around the sleeve are high and low speed gear trains composed of gears 196, 198 and 200, and gears 232, 236 and 238, respectively, arranged on spindles 202, 204 and 206, supported between stationary plate 22 and a rear housing wall 24. The gear 196 of the high speed gear train 196, 198 and 200 is geared directly to a power driven gear 194 keyed to the hub, and gears 198 and 200 are thus power driven in reverse directions. The gear 232 of the low speed gear train is driven from the gear 196 through a planetary speed reducer 197, and drives gears 236 and 238 reversely with respect to each other at a relatively slow speed. Through selective operation of any one of four hydraulic clutches 199, 201, 237 and 239 associated with each of the gears 198, 200, 236 and 238, one or the other of gears 210 or 212 is caused to drive in either direction the externally and internally toothed control ring gear 178 of an intergearing 177 at a high or low rate of speed. Movement of the control gear is transmitted through the planetary intergearing to a hub carried gear 140, which may be advanced or retarded at high or low speed relative to the hub to vary the blade pitch, transmission to each blade being individually effected through means including gears 138, driving, through shafts 136 and 88, a worm 56 and a worm wheel sector 54 carried by each blade shank. The pitch may be fixed, by holding ring gear 178 by means of a combination hydraulic and centrifugal brake 500 connected to gear 512. Feathering or unfeathering, when propeller rotation is at a low speed or stopped, is accomplished through an auxiliary motor 580 acting through a gear 578.

Referring more particularly to the hub, each of the blade sockets 32 is provided with a threaded blade retention nut 36 against which the outer race members 37 of the thrust bearing 38 bear. The inner race member 39 of the thrust bearing engages a shoulder or flange 40 upon the shank 34. Within the base of each socket is arranged, upon a hub sleeve extension 41, a thrust bearing support 42 having slidingly mounted thereon upon a pad 43, a thrust bearing 44 carrying a preloading annular spring disc 46 adapted to resiliently urge the end of each of the blade shanks 34 outwardly during non-rotation of the hub. Any suitable packing such as 48 may be provided in conjunction with each of the retaining rings 36 to confine the lubricant in the thrust bearings 38. The inner race member 39 of the thrust bearing and retaining ring 52 may be split to facilitate mounting on the shank.

Figure 2:
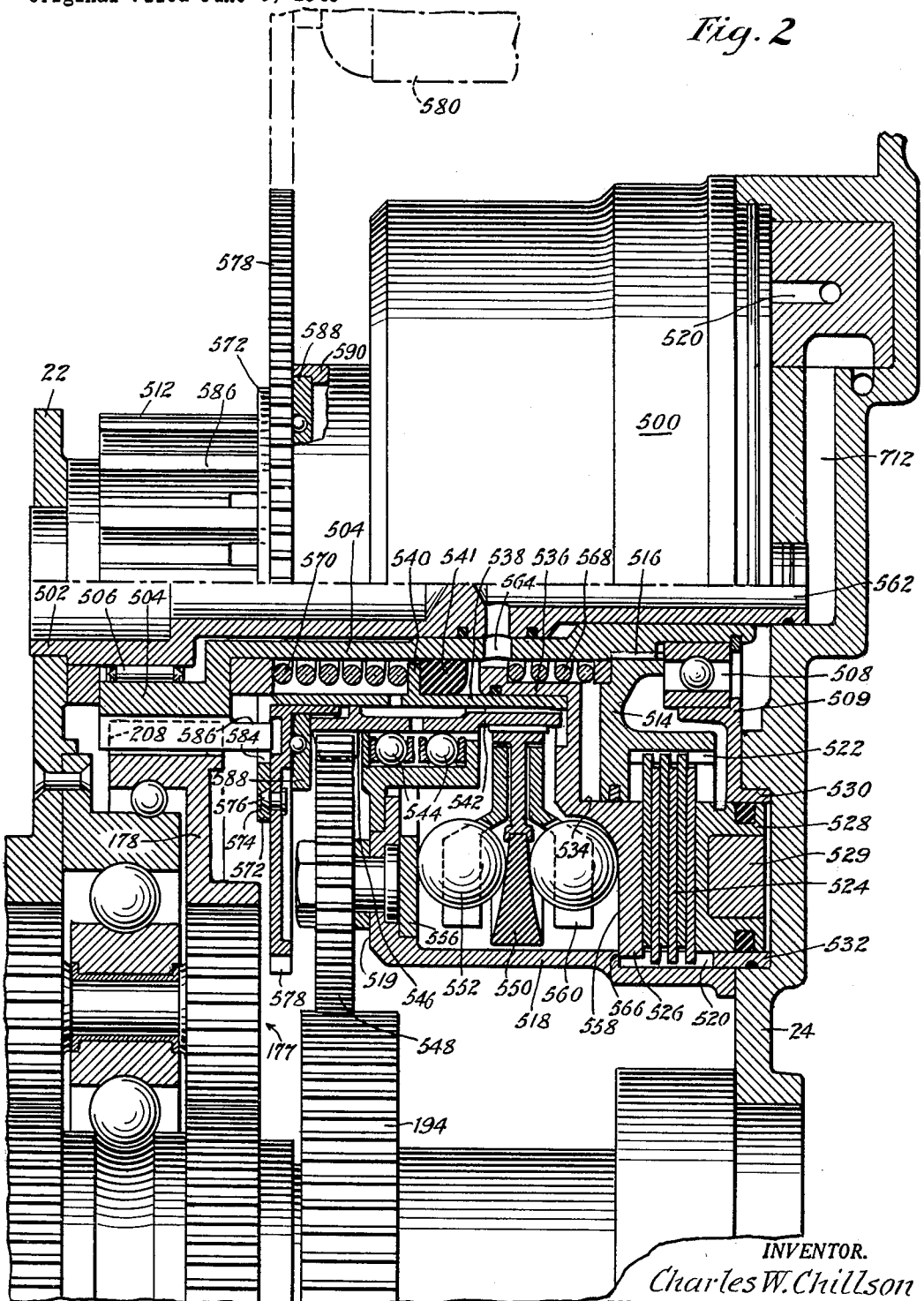
Fig. 2 is a side elevation of a brake according to the invention, in conjunction with other parts.

While the worms 56 and worm wheels 54 are irreversible, and would tend to hold the pitch of their respective blades, it is desirable to absolutely fix pitch against gradual creepage due to vibration and the high centrifugal blade twisting moments usually present. For this purpose a hydraulic disc brake generally denoted by the reference character 500 is provided. As illustrated in detail in Fig. 2 the brake constitutes a unitary assembly centered upon a spindle 502 extending from the front plate 22 to the rear wall 24. The spindle is provided with a rotatable sleeve 504 mounted upon a bearing 506 rolling on the spindle 502, and a thrust bearing 508 surrounding the sleeve and retained in a flanged member 509 centered upon the rear wall 24. Gear teeth 512 in the plane of the bearing 506 engage the external teeth 208 of the annular gear ring 178. It will be understood that by holding the gear ring 178, the blade pitch will be fixed by reason of the intergearing 177 heretofore described.

The sleeve 504 is provided adjacent the bearing 508, with a combined brake disc carrying ring and annular stationary piston 514 splined to the sleeve as at 516. The housing 518, secured to the rear wall 24 is provided with internal brake disc engaging splines 520, which together with the splines 522 of the ring 514, engage alternate discs 524, located between a pressure plate 526 and an annular brake applying piston 528. The U-sectioned piston 528, filled with light plastic 529, is adapted to move in an annular cylinder formed by a cylindrical flange 530 on the bearing member 509, and a cylindrical ring 532, partially located in the housing 518, partially located in the rear wall 24, and abutting against the splines 520. The pressure plate 526, held non-rotatable by splines 520, is provided with an internal cylindrical wall 514. The inner end of the pressure plate is formed into a sleeve 536, which is embraced slidably by a slip clutch carrying sleeve 538, having an internal flange 540 against which a packing 541 in engagement with the gear sleeve 504 may bear. The sleeve 538 rotates with the gear 504.

Surrounding the slip action clutch sleeve is a centrifugal wall driving sleeve 542 journalled in the end wall 519 of the housing 518, on bearings 544. The sleeve is geared through teeth 546, and idler gear 548 with the power take off gear 194, so that rotation of the sleeve 542 is proportional to propeller shaft speed. Freely splined on the inner end of the ball driving sleeve is an annular concave wedge sectioned ball race member 550, upon which sets of balls 552 and 554 roll, the sets bearing against a thrust ring 556 in the end wall 519, and against the rear face 558 of the pressure plate 526. The sets of balls are held in uniformly angularly spaced relation by freely rotating retainers 560, which permit the balls to move radially in response to centrifugal force when they are driven by the race member 550.

From the foregoing, it will be observed that bodily rotation of the balls about the axis of the brake unit moves the balls radially outward and they exert pressure upon the pressure plate 526 tending to apply the brake by squeezing the discs 524, the piston 528, being limited in its rightward movement by engagement with the housing 24 which acts as a reaction member. This centrifugal force varying with rotation speed may act to fix the pitch of the blades, the braking force increasing with propeller speed, so that the brake holding power may always exceed that required to offset the blade centrifugal twisting moments which likewise increase with speed.

The centrifugal brake applying force, under normal circumstances, is curbed through the application of fluid pressure in the space between the piston wall 514 and the cylinder formed by the pressure plate and the cylindrical wall 534, fluid pressure being admitted for this purpose through the hollow 562 of the spindle 502, and ports 564 in sleeve 504. Such fluid pressure is obtained from the source of fluid power employed for operation of the brake and clutches, which source varies in pressure with propeller speed, the pressure, however, being more than adequate under normal operation to hold the pressure plate 526 to the left, against the housing shoulder 566. Upon failure of such source, however, it will be observed that centrifugal action will apply the brake except at a speed below, for example, 150 to 200 revolutions per minute of the propeller shaft, at which time the force of spring 568 is sufficient to hold the pressure plate against the shoulder 566.

To positively position the externally splined plates of the clutches and brake uniformly, when released, and to assist instantaneous release when the piston pressure is relieved, light annular resilient rings, wavy in form, may be positioned between alternate adjacent plates within the brake casing 518. Such rings are wavy or sinuous axially of the clutch, and resiliently bear against the adjacent alternate plates at spaced staggered points, with a pressure sufficient to assist instantaneous plate release.

Actuation of the clutches 199, 201, 237 and 239 is controlled by solenoid valves 702, 704, 706 and 708, so connected to the pressure source that the brake is applied when the solenoid valves are de-energized and the clutches released. Fluid under pressure, under these circumstances, from the gear pump 710, the drive of which pump will be described, is conducted through pressure conduit 712, through each of the valve interconnecting conduits 714, 716, 718 and thence to the annular brake actuating piston 528 through conduit 720. Movement of any one of the balanced valve plungers 722, 724, 726 or 728 to the left through energization of its respective solenoid against biasing springs 731 immediately connects the brake conduit 720 with the sump conduit 730, through the valve so operated, and one or more of the interconnecting valve passages 732, 734 and 736. Upon moving any one of the valves to the left, one of the clutch conduits 723, 725, 727 or 729 is connected to pressure conduit 712 through the respective valve that has been actuated, directly in the case of valve 702, and through one or more of the interconnecting conduits 714, 716 and 718, in the case of the other valves. The valves 702, 704, 706 and 708 are so arranged that one valve takes precedence over other valves in the order named, so that in no event may more than one clutch be actuated, and then only upon release of the brake.

Figure 3:
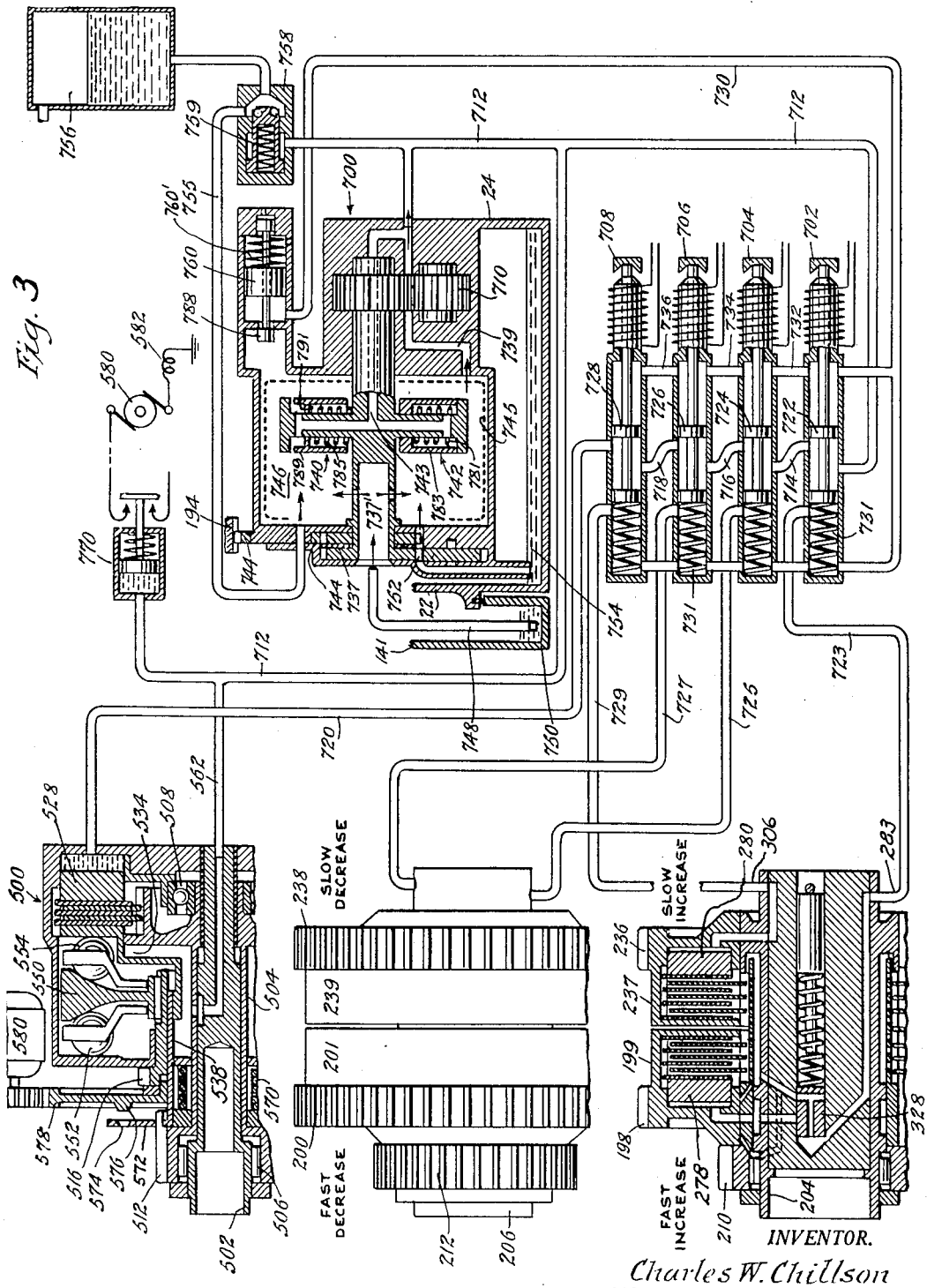
Fig. 3 is a control diagram showing the fluid system used with the brake and other components.

The unit housing 700 (Fig. 3) contains the gear pump 710 previously mentioned, and several additional hydraulic control devices. Upon a boss at the upper left-hand corner of the housing 700 a gear 744 is shown, this gear being driven from the power gear 194. Gear 744 is an idler and meshes with another gear 737 secured to a shaft 737' upon which one of the gears of the pump 710 is mounted. Thus, pump 710 is driven by a power gear 194. The pump is provided with an inlet 739 and the shaft 737' is provided with centrifugal valves 740 and 742 relieving the pressure of the gear pump 710 at all speeds below 200 R. P. M. and the latter 740 controlling the pressure developed at all speeds above 200 R. P. M., so that pressure in the conduit 712 increases as the speed of the propeller and pump increases, commencing at 200 R. P. M. of the propeller shaft. To accomplish this result, the valve spring 781 of the valve 742 holds the valve sleeve 783 radially inward until a speed of 200 R. P. M. is attained; after which centrifugal force on the sleeve moves the valve outwardly and holds the valve closed. The valve spring 785 of the valve 740 holds the sleeve 789 radially outward, together with centrifugal force until fluid pressure develops in the pump output 743 and acts on the outer surface of a flange of the wall 791 and forces the sleeve inward for relief of excess pressure between the sleeve end and the flange end of the rotary valve stem. The pressure is thereby maintained as a function of the centrifugal force and of the rotational speed. As shown, the valve 740 is open and the valve 742 is closed, the propeller being assumed as rotating at a substantial speed.

The chamber 746 in housing 700 is supplied with hydraulic fluid from a scavenger scoop 748 extending into the annular channel 750 formed around the periphery of the bulkhead 141 and from an auxiliary scavenger gear pump 752 driven by shaft 737', picking up fluid 754 from within the stationary casing, lost through seals, and the lubrication channels in the various clutches, etc. The chamber 746 is also supplied from a supply line 755 leading to the reservoir 756 through a shut-off valve 758 held open against a spring 759 upon the establishment of pressure in the conduit 712. This valve 758 closes if pressure in line 712 becomes negligable, prevent dumping of reservoir contents into the assembly 700. The pressure from line 712 acts on a piston embracing the spring 759, the piston cavity being isolated from the valve portion connected to the reservoir and the line 755. The supply line 755 enters the chamber 746 at a radius from the center so as to be influenced by the level within the chamber established by centrifugal action of the vane effect of the casings of valves 740 and 742 and other vanes as may be desired and the cylindrical filter screen 745 rotating therewith, the liquid building up through such action in an annular layer within the chamber 746. A valve 788, normally pressed open by a light spring 760' behind a piston 760, admits oil from the chamber 746 to the line 730 to feed lubricant to the clutch and brake parts. When centrifugal pressure in chamber 746 exceeds a value of about 5–10 pounds per square inch, this pressure will act on piston 760 to close valve 788, thereby limiting the maximum pressure which may exist in the line 730. This maintains a positive pressure in the sump line sufficient to maintain fluid in all of the ports and chambers, and particularly the clutch discs by action of the valve 328. The centrifugal chamber is such as to filter the liquid, and remove entrained air as well as to provide a base source, centrifugally maintained independent of the flight aspect of the airplane, from which the pump inlet 739 may at all times receive pressure fluid.

It will be observed that the conduit 712 is at all times connected with the brake pressure plate cylinder 534 and piston, so that the centrifugal force of the balls 552 and 554 are restrained from applying the brake so long as the pressure in conduit 712 is normal as determined by the speed of the centrifugal speed responsive pressure establishing valve 740. At the same time, a fluid pressure feather motor switch 770 is maintained open so long as pressure exists within the line 712.

Other parts of the pitch change assembly are shown in the drawings but are not relevant to the invention claimed herein. These other parts are fully described in the original application of which this is a division, the original having issued as Patent No. 2,640,552 on June 2, 1953.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. In a rotating mechanism, a friction coupling engageable to lock the mechanism against rotation comprising a casing having a plurality of stator discs supported therein, a rotatable shaft having a plurality of rotor discs interleaved with said stator discs, said discs together comprising a stack, a pressure plate at each end of said stack having limited movement away from said discs and movable toward them to press the discs together, hydraulic means for moving one of said plates toward said discs, centrifugal means for moving the other plate toward said discs, and hydraulic means for moving said last named plate toward the limit of its movement away from said discs.

2. In a rotating mechanism, a friction coupling engageable to lock the mechanism against rotation comprising a casing having a plurality of stator discs supported therein, a rotatable shaft having a plurality of rotor discs interleaved between said stator discs, said discs together comprising a stack, a pressure plate at each end of said stack having limited movement away from said discs and movable toward them to press the discs together, hydraulic means for moving one of said plates toward said discs, hydraulic means for moving the other of said plates away from said discs, a plate fixed in spaced relation to said last named plate, a rotating annular wedge sectioned cam member thick at its edge and thin toward its center positioned between said fixed plate and last named pressure plate and defining annular ball cavities, with said plates, on each side thereof, centrifugal balls rolling on said last named plates and annular cam member disposed in said cavities, and means for rotating said balls about the rotation axis of said cam member at a speed proportional to the rotation speed of said shaft, said coupling being urged into engagement by the centrifugal force exerted by said balls in opposition to the disengaging action of said last named hydraulic means.

3. In a rotating system including a non-rotating support, a friction coupling including selectively engageable means for connecting part of said rotating system to said support to stop rotation of said part, continually rotating means connected to said system having mechanism to urge said friction coupling into engagement, a source of power for said selectively engageable means, and means operated by said source of power to counteract said mechanism to keep said friction coupling free for operation by said selectively operable means, said last means becoming inoperative upon failure of said power source to enable said mechanism to urge said friction coupling into engagement.

4. In a rotating system including a rotating part adapted to be stopped at times from rotation, a reaction member, friction brake between said part and member, a hydraulic pressure fluid source, first hydraulic means fed from said source to operate said brake selectively, a second hydraulic means fed from said source operable when pressurized to hold said brake in a condition for selective engagement and disengagement by said first hydraulic means, and means energized by rotation of said system, counteracting said second hydraulic means, connected to said brake to engage same upon cessation of said fluid pressure feed to said first and second hydraulic means.

5. In a rotating system including a rotating part adapted to be stopped at times from rotation, a reaction member, friction brake between said part and member, a hydraulic pressure fluid source, first hydraulic means fed from said source to operate said brake selectively, a second hydraulic means fed from said source operable when pressurized to hold said brake in a condition for selective engagement and disengagement by said first hydraulic means, and means energized by rotation of said system, counteracting said second hydraulic means, connected to said brake to engage same upon cessation of said fluid pressure feed to said first and second hydraulic means, said system energized means comprising a centrifugally actuated device which exerts force to engage said brake in opposition to said second hydraulic means.

6. In a rotating system including a rotating part adapted to be stopped at times from rotation, a reaction member, a friction brake between said part and member, a hydraulic pressure fluid source, first hydraulic means fed from said source to operate said brake selectively, a second hydraulic means fed from said source operable when pressurized to hold said brake in a condition for selective engagement and disengagement by said first hydraulic means, and means energized by rotation of said system, counteracting said second hydraulic means, connected to said brake to engage same upon cessation of said fluid pressure feed to said first and second hydraulic means, said system energized means comprising a centrifugally actuated device which exerts force to engage said brake in opposition to said second hydraulic means, the device comprising an annular cam plate secured to part of the brake, and rollers bearing on said plate and rotated by said system.

7. In a rotating system including a non-rotating support, a friction brake connected between said support and part of said rotating system, means positively energized by system rotation urging said brake to braking position, a servo mechanism including a connection from said mechanism to overcome said positively energized means during normal operation of the servo mechanism, said brake being engaged by said positively energized means upon failure of said servo mechanism, and means operable selectively and connected to engage and disengage said brake during normal operation of the rotating system and servo mechanism.

References Cited in the file of this patent

UNITED STATES PATENTS 2,401,256     Lear _____ May 28, 1946